(12) United States Patent
Flammer, III

(10) Patent No.: US 8,306,090 B2
(45) Date of Patent: Nov. 6, 2012

(54) POWER LINE COMMUNICATION USING FREQUENCY HOPPING

(75) Inventor: George Flammer, III, Cupertino, CA (US)

(73) Assignee: Silver Spring Networks, Inc., Redwood City, CA (US)

( * ) Notice: Subject to any disclaimer, the term of this patent is extended or adjusted under 35 U.S.C. 154(b) by 524 days.

(21) Appl. No.: 12/564,158

(22) Filed: Sep. 22, 2009

(65) Prior Publication Data

US 2010/0074304 A1    Mar. 25, 2010

Related U.S. Application Data

(60) Provisional application No. 61/099,041, filed on Sep. 22, 2008.

(51) Int. Cl.
*H04B 1/00* (2006.01)
(52) U.S. Cl. ........................................................ 375/135
(58) Field of Classification Search .................. 375/135, 375/130, 132, 133, 134, 138; 370/254, 256, 370/330
See application file for complete search history.

(56) References Cited

U.S. PATENT DOCUMENTS

| | | | |
|---|---|---|---|
| 4,763,103 A | 8/1988 | Galula et al. | |
| 4,968,970 A | 11/1990 | LaPorte | |
| 2007/0217455 A1 * | 9/2007 | Haeusler | 370/913 |

FOREIGN PATENT DOCUMENTS

| EP | 0 199 148 A2 | 10/1986 |
|---|---|---|
| WO | 00/52842 A1 | 9/2000 |

OTHER PUBLICATIONS

Dostert, K. et al "Storsichere Vierkanal-Datenuebertragung auf Stromversorgungsleitungen" Nachrichtentechnik Elektronik, VEB Verlag Technik, Berlin, Germany, Jan. 1, 1990, pp. 412-418.
International Search Report and Written Opinion, dated Feb. 10, 2010.

* cited by examiner

*Primary Examiner* — Khai Tran
(74) *Attorney, Agent, or Firm* — Buchanan Ingersoll & Rooney PC

(57) ABSTRACT

Communications among multiple nodes via a shared power line medium are carried out by dividing the available frequency spectrum in the shared power line medium into plural non-overlapping channels. A first channel is assigned to a first group of nodes, and a second channel, different from the first channel, is assigned to a second group of nodes. Communications between the first group of nodes can occur simultaneously with communications between the second group of nodes via the shared power line medium. Time slots may be assigned for the communications between the first group of nodes that occurs simultaneously with the communications between the second group of nodes via the shared power line medium. The simultaneous communications between different groups of nodes via a shared power line medium may be implemented using a frequency-hopping spread spectrum technique.

4 Claims, 1 Drawing Sheet

POWER LINE COMMUNICATION USING FREQUENCY HOPPING

CROSS-REFERENCE TO RELATED APPLICATIONS

This disclosure claims priority from U.S. Provisional Patent Application Ser. No. 61/099,041, filed Sep. 22, 2008, the content of which is hereby incorporated by reference in its entirety.

BACKGROUND

1. Field of the Invention

The disclosed subject matter is generally directed to Advanced Metering Infrastructure (AMI), via which data is communicated between a utility, such as an electric power company, and meters that are located at the premises of the customers of the utility. The exemplary embodiments are particularly aimed at efficient and economical communications between the meters and servers at the back office or other central facility of the utility.

2. Description of Related Art

Power line carrier (PLC) or power line communications, also known as Power line Digital Subscriber Line (PDSL), mains communication, power line telecom (PLT), or power line networking (PLN), is a system for carrying data on a conductor also used for electric power transmission. Broadband over Power Lines (BPL) is an example of a system that uses PLC by sending and receiving information-bearing signals over power lines to provide access to the Internet.

Typically, electrical power is transmitted over high voltage transmission lines, distributed over medium voltage lines, and used inside buildings at lower voltages. Power line communications can be applied at each stage. Most PLC technologies limit themselves to one set of wires, e.g., premises wiring, but some can cross between two stages, e.g., both the distribution network and premises wiring.

Known power line communications systems operate by impressing a modulated carrier signal on the wiring system. Different types of power line communications use different frequency bands, depending on the signal transmission characteristics of the power wiring being used. Since the power wiring system was originally intended for transmission of AC power at a nominal frequency of, e.g., 50 or 60 Hz, the power line circuits have only a limited ability to carry higher frequencies. This propagation problem is a limiting factor for each type of power line communications.

Data rates over a power line communication system vary widely. Low frequency (about 100-200 kHz) carriers impressed on high-voltage transmission lines may carry one or two analog voice circuits, or telemetry and control circuits with an equivalent data rate of a few hundred bits per second. However, these circuits may be many miles long. Higher data rates generally imply shorter ranges. A local area network operating at millions of bits per second may only cover one floor of an office building, but eliminates installation of dedicated network cabling.

Power line communications can also be used to interconnect home computers, peripherals or other networked consumer peripherals. Proprietary specifications for power line home networking have been developed by a number of different companies within the framework of the HomePlug Powerline Alliance, the Universal Powerline Association and the HD-PLC Alliance.

Broadband over power lines (BPL), also known as powerline Internet or powerband, is the use of PLC technology to provide broadband Internet access through ordinary power lines. A computer (or any other device) only needs to plug a BPL "modem" into any outlet in an equipped building to have high-speed Internet access. International Broadband Electric Communications, or IBEC, and other companies currently offer BPL service to several electric cooperatives.

BPL may offer benefits over regular cable or DSL connections: the extensive infrastructure already available enables people in remote locations to access the Internet with relatively little equipment investment by the utility. In addition, such ubiquitous availability would make it much easier for other electronics, such as televisions or sound systems, to be connected.

However, variations in the physical characteristics of the electricity network and the current lack of IEEE standards mean that provisioning of the service is far from being a standard, repeatable process. In addition, the amount of bandwidth a BPL system can provide, compared to cable and wireless, is in question.

Known PLC systems have a number of issues. The primary one is that power lines are inherently a very noisy environment. Every time a device turns on or off, it introduces a pop or click into the line. Energy-saving devices often introduce noisy harmonics into the line. The system must be designed to deal with these natural signaling disruptions and work around them.

Power distribution uses step-down transformers to reduce the voltage for use by customers. However, BPL signals cannot readily pass through transformers, as their high inductance makes them act as low-pass filters, blocking high-frequency signals. Thus, repeaters must be attached to the transformers. Broadband over power lines has developed faster in Europe than in the United States due to a historical difference in power system design philosophies.

In the U.S., it is common for a small transformer hung from a utility pole to service a single house or a small number of houses. In Europe, it is more common for a somewhat larger transformer to service 10 to 100 houses. For delivering power to customers, this difference in design makes little difference for power distribution. However, delivering BPL over the power grid in a typical U.S. city requires an order of magnitude more repeaters than in a comparable European city. On the other hand, since bandwidth to the transformer is limited, this can increase the speed at which each household can connect, due to fewer people sharing the same line. One possible solution is to use BPL as the backhaul for wireless communications, for instance by mounting Wi-Fi access points or cell phone base stations on utility poles, thus allowing end-users within a certain range to connect with equipment they already have. BPL may also be used as a backhaul for WiMAX networks.

Another issue is signal strength and operating frequency. Known systems have operated at frequencies of 10 to 30 MHz, which have been used for many decades by amateur radio operators, as well as international shortwave broadcasters and a variety of communications systems (military, aeronautical, etc.). Power lines are unshielded and will act as antennas for the signals they carry, and have the potential to interfere with shortwave radio communications.

Known technologies that communicate over a shared power line bus have been concerned with the speed and reliability of the communications. Reliability may be addressed through the use of error correction codes and other algorithms designed to mitigate the unique noise environment of the power lines. Frequency adaptive and/or speed variable modulator/demodulators (modems) have been employed to increase reliability as well. For example, modern BPL systems may use OFDM modulation, which allows them to mitigate interference with radio services by removing specific frequencies that are used.

Applications of power line communications vary widely, as would be expected of such a widely available medium. One natural application of narrow band power line communication is the control and telemetry of electrical equipment, such as meters, switches, heaters and domestic appliances. A number of known developments have considered such applications from a systems point of view, such as "Demand Side Management." In this implementation, domestic appliances would intelligently coordinate their use of resources, for example, limiting peak loads.

Control and telemetry applications include both "utility side" applications, which involve equipment belonging to the utility company, i.e., between the supply transformer substation up to the domestic meter, and "consumer-side" applications, which involve equipment in the consumer's premises. Possible utility-side applications include automatic meter reading (AMR), dynamic tariff control, load management, load profile recording, credit control, pre-payment, remote connection, fraud detection and network management, and could be extended to include gas and water.

Utility companies also use special coupling capacitors to connect medium-frequency radio transmitters to the power-frequency AC conductors. Frequencies used are in the range of 24 to 500 kHz, with transmitter power levels up to hundreds of watts. These signals may be impressed on one conductor, on two conductors or on all three conductors of a high-voltage AC transmission line. Several PLC channels may be coupled onto one high voltage line. Filtering devices are applied at substations to prevent the carrier frequency current from being bypassed through the station apparatus and to ensure that distant faults do not affect the isolated segments of the PLC system. These circuits are used for control of switchgear, and for protection of transmission lines. For example, a protection relay can use a PLC channel to trip a line if a fault is detected between its two terminals, but to leave the line in operation if the fault is elsewhere on the system.

One aspect of the use of this type of shared media has not been previously addressed, namely, the simultaneous communication by multiple nodes or devices on the shared bus. This is because, to date, the shared use of power lines has been accomplished by time-division access to the media. This approach is more applicable when all the communicating units are members of the same installation, particularly when they are all being controlled by a common controlling node. In the case of autonomous transmissions by the various units, however, such an approach becomes impractical.

SUMMARY

In an exemplary embodiment, communication between multiple nodes via a shared power line medium may include dividing the available carrier frequency spectrum in the shared power line medium into plural non-overlapping channels, assigning a first channel to a first group of nodes, assigning a second channel, different from the first channel, to a second group of nodes and communicating between the first group of nodes simultaneously with communicating between the second group of nodes via the shared power line medium.

Time slots may be assigned for the communications between the first group of nodes that occurs simultaneously with the communications between the second group of nodes via the shared power line medium.

The simultaneous communications between different groups of nodes via a shared power line medium may be implemented using frequency-hopping of the carrier signal.

BRIEF DESCRIPTION OF THE DRAWINGS

As will be realized, different embodiments are possible, and the details disclosed herein are capable of modification in various respects, all without departing from the scope of the claims. Accordingly, the drawings and descriptions are to be regarded as illustrative in nature and not as restrictive. Like reference numerals have been used to designate like elements.

DETAILED DESCRIPTION

Figure 1:
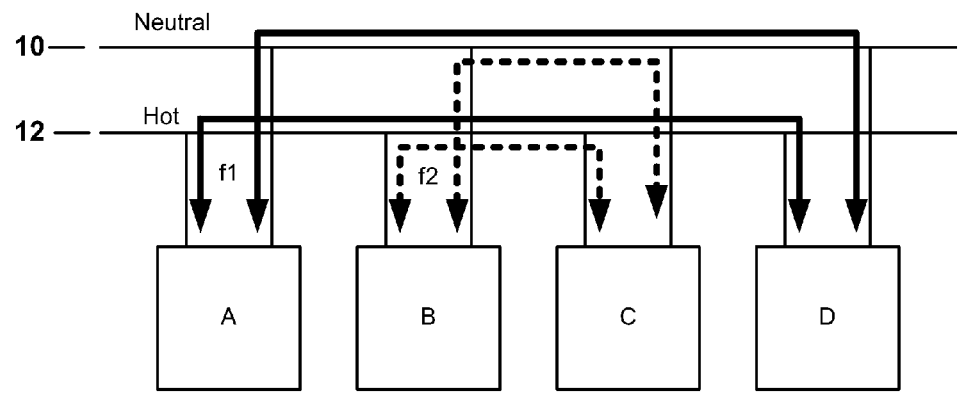
FIG. 1 is a block diagram illustrating temporally overlapping communications between two pairs of nodes.

In accordance with the embodiments described hereinafter, the available spectrum on the power lines for the carrier signals is divided into several non-overlapping channels, so that communication between pairs (or groups) of nodes, e.g., meters, can, by simple selection of different channels, occur simultaneously. An exemplary implementation is shown in FIG. 1. A first pair of nodes, A and D, which communicate via power lines 10 and 12, do so via a first carrier frequency f1, depicted by the heavy solid lines. A second pair of nodes, B and C, communicate with each other at the same time via a second carrier frequency f2, as shown by the broken lines. Although only two nodes are involved in each set of communications in the example shown, it will be appreciated that a node can transmit to multiple nodes simultaneously at the designated frequency.

Figure 2:
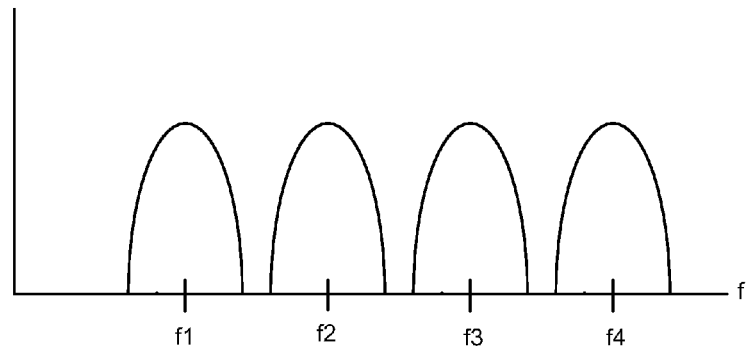
FIG. 2 is a frequency spectrum chart showing separate non-overlapping channels for the carrier frequency.

FIG. 2 is a frequency spectrum chart showing the separate non-overlapping frequency channels for the carrier signal. In the illustrated example, four distinct frequency channels are depicted, which would enable a node in each of four separate groups of nodes to communicate with other members of its group at the same time that nodes in the other groups communicate with the members of their respective groups. Alternatively, if full-duplex communications are desired, two of the frequency channels can be assigned to one group, to enable one node in the group to transmit to another node of the group over one of the assigned channels, while at the same time the other node can transmit to the one node over the second assigned channel.

The simultaneous use of shared PLC media may be accomplished through the implementation of a frequency-hopping spread spectrum (FHSS) technique to transmit data over the power lines. FHSS provides a reliable way to transmit radio signals by rapidly switching a carrier among multiple frequency channels, using a pseudorandom sequence known to both transmitter and receiver. This approach may offer particularly advantageous results in the context of PLC communications, because the power line media exhibits characteristics that cause deterioration of the transmitted signal, such as frequency-selective fading, Gaussian and non-Gaussian noise, interfering signals, propagation loss between nodes on the media, etc., that can be addressed by such a technique.

Figure 3:
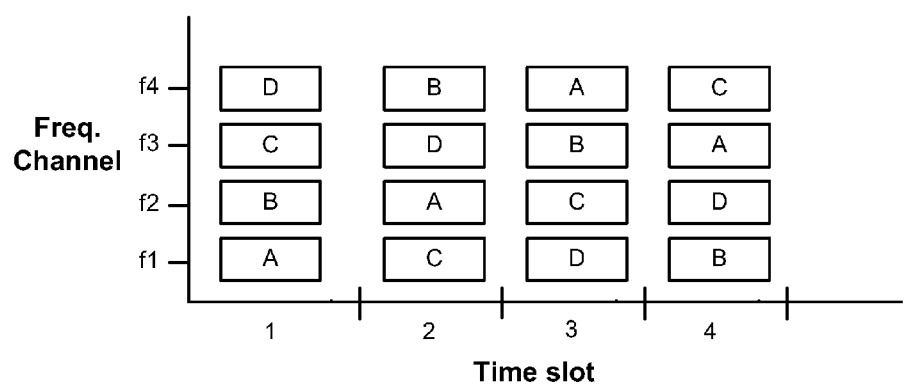
FIG. 3 is a timing diagram of a frequency-hopping embodiment where communications are divided into time-slots as well as frequency channels.

In an exemplary embodiment shown in FIG. 3, the communications are divided into assigned time slots as well as carrier frequency channels. During time slot 1, the nodes A-D might be tuned to respectively receive communications transmitted at frequencies f1, f2, f3 and f4. During time slot 2, they might shift to frequencies f2, f4, f1 and f3, respectively. In time slot 3, their respective assigned frequencies might be f4, f3, f2 and f1. The frequency-hopping pattern of each node is known to all of the other nodes, so that when a given node has a message to transmit to another node, it switches to the frequency channel of the receiving node for the current time slot, and transmits the message during that time slot at the designated carrier frequency. If the length of time remaining in the current time slot is not sufficient to transmit the message, e.g. complete packet, it may be more practical for the transmitting node to wait until the next time slot, and transmit the message at the frequency assigned to the receiving node for that time slot. If the time required to transmit the message, or streaming data, is longer than the length of a single time slot, the transmitting and receiving nodes may remain on the frequency channel for the duration of the message or streaming date, rather than switching channels at each time slot. Once the message or data is complete, the receiving node can then resume its frequency hopping pattern at the channel where it would have been normally been for the current time slot.

If one or more of the available carrier frequencies exhibits a loss of signal quality or deterioration, switching to another carrier frequency during a future, e.g., the next, assigned time slot may provide a more reliable solution for retransmitting lost data. Likewise, if one of the carrier frequency channels is blocked for a long period of time, e.g., due to the transmission of streaming video or audio, a node can switch to an open channel during its next time slot to receive incoming data in a timely fashion.

The example described above, where the frequency channel for a communication is determined by the frequency hopping pattern of the receiving node, is suitable for point-to-point communications. For a broadcast environment, however, it may not be practical for the transmitting node to transmit the same message multiple times over different frequency channels, in order to reach all of the intended receiving nodes. In that case, it may be more appropriate to use the frequency-hopping pattern of the transmitting node to determine the channel to be used for a given communication. In that case, when one or more nodes are set up to receive data from another node, e.g. at a predetermined time, the receiving node(s) tune to the frequency channel at which the designated broadcast node is transmitting during the current time slot.

One of the challenges of frequency-hopping systems is to synchronize the transmitter and receiver. An example of an approach to accomplish this synchronization is to have the transmitter use all the channels in a fixed period of time. The receiver can then find the transmitter by picking a random channel and listening for valid data on that channel. The transmitter's data may be identified by a special sequence of data that is unlikely to occur over the segment of data for the selected channel. In addition, the data segment can include a checksum for integrity and further identification. The transmitter and receiver can use fixed tables of channel sequences so that, once synchronized, they can maintain communication by following the table. On each channel segment, the transmitter can send its current location in the table.

While four distinct frequency channels are illustrated in the example shown in FIG. 2, it will be appreciated that the number of channels is preferably much larger, e.g., from about 75 to several hundred channels.

The FHSS embodiment also offers several other advantages over a fixed-frequency transmission. Spread-spectrum signals are highly resistant to narrowband interference. The process of reassembling a spread signal disperses the interfering signal, causing it to recede into the background.

Spread-spectrum signals can also provide security in that they can be difficult to intercept. An FHSS signal simply appears as an increase in the background noise to a narrow-band receiver. Eavesdroppers would only be able to intercept the transmission if they knew the pseudorandom sequence of carrier frequencies.

Spread-spectrum transmissions can share a frequency band with many types of conventional transmissions with minimal interference. The spread-spectrum signals add minimal noise to the narrow-frequency communications, and vice versa. As a result, bandwidth can be utilized more efficiently.

The overall bandwidth required for frequency hopping is much wider than that required to transmit the same information using only one carrier frequency. However, because transmission occurs only on a small portion of this bandwidth at any given time, the effective interference bandwidth is effectively the same. The frequency-hopping approach reduces the degradation caused by narrowband interferers.

In addition, in the US, Federal Communications Commission (FCC), Regulation 47 CFR Part 15, pertaining to unlicensed systems in the 900 MHz and 2.4 GHz bands, permits more power than non-spread spectrum systems. The limit is increased from 1 milliwatt to 1 watt. Both frequency hopping and direct sequence systems can transmit at 1 watt. The FCC also prescribes a minimum number of channels and a maximum dwell time for each channel.

The above description is presented to enable a person skilled in the art to make and use the systems and methods described herein, and is provided in the context of a particular application and its requirements. Various modifications to the embodiments will be readily apparent to those skilled in the art, and the generic principles defined herein may be applied to other embodiments and applications without departing from the spirit and scope of the claims. Thus, there is no intention to be limited to the embodiments shown, but rather to be accorded the widest scope consistent with the principles and features disclosed herein.

What is claimed is:

1. A method of communication among multiple nodes via a shared power line medium, comprising:
   dividing an available carrier frequency spectrum in the shared power line medium into plural non-overlapping carrier frequency channels;
   designating time slots for communications among the multiple nodes;
   assigning to each node a frequency-hopping pattern in which a different respective frequency channel is employed during each time slot for communications with that node;
   transmitting data from a first node to a second node during a given time slot, using the frequency channel assigned to one of the first and second nodes for that time slot; and
   transmitting data from a third node to a fourth node during said given time slot, using the frequency channel assigned to one of the third and fourth nodes for that time slot.

2. The method of claim 1, in which the frequency channels that are employed during said given time slot for the transmissions from said first node to said second node, and from said third node to said fourth node, respectively, are determined by the frequency-hopping patterns assigned to the receiving second and fourth nodes.

3. The method of claim 1, in which the frequency channels that are employed during said given time slot for the transmissions from said first node to said second node, and from said third node to said fourth node, respectively, are determined by the frequency-hopping patterns assigned to the transmitting first and third nodes.

4. The method of claim 1, further including a step of synchronizing the first and second nodes to one another by:

sequentially transmitting data from the first node over all of the frequency channels of a predetermined assigned pattern;

selecting one of said frequency channels at the second node, and listening for data from the first node on said selected frequency channel; and upon detecting valid data from the first node at the second node, employing the predetermined assigned pattern at the second node to receive communications from the first node.

* * * * *